C. E. ANDERSSON.
PRESSURE BURNER WITH COMPRESSED MIXING PIPE.
APPLICATION FILED AUG. 27, 1909.
945,072.
Patented Jan. 4, 1910.
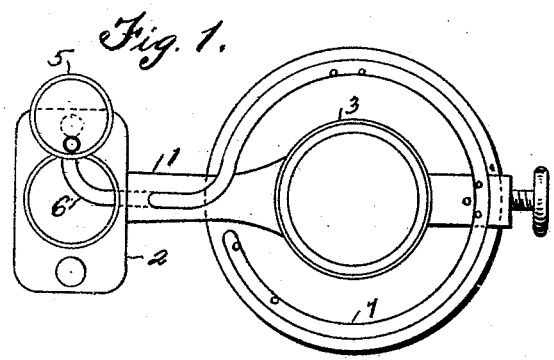
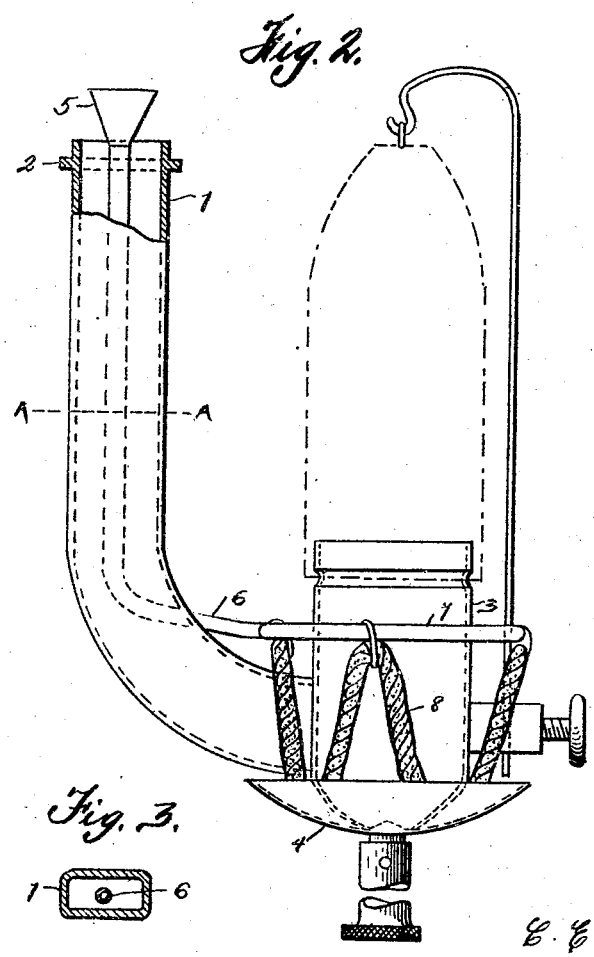

UNITED STATES PATENT OFFICE.

CARL EMIL ANDERSSON, OF ESKILSTUNA, SWEDEN, ASSIGNOR TO AKTIEBOLAGET ESKILSTUNA SEPARATOR, OF ESKILSTUNA, SWEDEN.

PRESSURE-BURNER WITH COMPRESSED MIXING-PIPE.

945,072. Specification of Letters Patent. Patented Jan. 4, 1910.

Application filed August 27, 1909. Serial No. 514,951.

*To all whom it may concern:*

Be it known that I, CARL EMIL ANDERSSON, a subject of the King of Sweden, and a resident of Eskilstuna, in Sweden, mechanician, have invented a new and useful Pressure-Burner with Compressed Mixing-Pipe, of which the following is a specification.

This invention refers to pressure burners for petroleum and similar fuels and has for its object to hinder the flame from turning backward and to reduce the shade field caused by the mixing tube. These objects are attained essentially by using a compressed or flattened mixing tube the lesser diameter of which is perpendicular or nearly so to the direction of the rays of light radiating from the flame and crossing the tube.

When using a small tube for introducing alcohol or the like for preliminarily heating the burner by means of an alcohol flame this alcohol tube may preferably be arranged within the mixing tube so as to still more reduce the free section of the mixing tube in certain direction.

In the accompanying drawing Figure 1 is a plan view and Fig. 2 a side view of a burner with such an arrangement. Fig. 3 is a horizontal section of the mixing tube on line A—A of Fig. 2.

In the form shown on the drawing the mixing tube 1 is compressed or flattened in such a manner, that the section forms a rectangle with rounded or obtuse corners, but any other compressed form may be used if preferred. The largest diameter is directed toward the center of light. The inwardly directed lower end is as usual connected to the central part 3 of the burner.

4 designates the usual alcohol cup which may be filled by means of the small pipe 6, the upper mouth 5 of which is enlarged to the shape of a funnel for facilitating the pouring. A part of this pipe 6 is placed in the mixing tube and the lower part which extends through the wall of mixing tube forms a perforated ring pipe 7, from which the fluid trickles down in the cup. Wicks 8 hanging down from this ring-pipe will enlarge the surface from which vapors of alcohol are given off and thus reinforce the combustion and quicken the lighting.

By means of the plate 2 or by any other suitable means the burner is fastened on its place.

For the sake of clearness, the vapor generator and the fuel feeding device are not herein illustrated, but it is to be understood that these may be of any of the well-known or approved forms of construction, no claim thereto being made in this application.

What I claim is:

1. In a pressure burner for petroleum and the like, a flattened mixing tube disposed with its greater diameter toward the center of light, and a pipe extended for a portion of its length within said mixing tube with its lower end extended through the side wall of said tube and having a portion encircling the burner.

2. In a pressure burner for petroleum and the like, an alcohol cup, a flattened mixing tube, a pipe extended within said mixing tube and having a portion encircling the burner, and wicks depending from the annular portion of said pipe into the alcohol cup.

In testimony whereof I have signed my name to this specification in the presence of two subscribing witnesses.

CARL EMIL ANDERSSON.

Witnesses:
R. LARSSON,
O. DILLNER.